Nov. 4, 1952     J. A. FAVRE     2,616,997
CYCLIC FLUID PRESSURE OVERLAPPED MULTICONTACT
SWITCHING MECHANISM FOR RECTIFIERS
Filed July 18, 1951     3 Sheets-Sheet 3
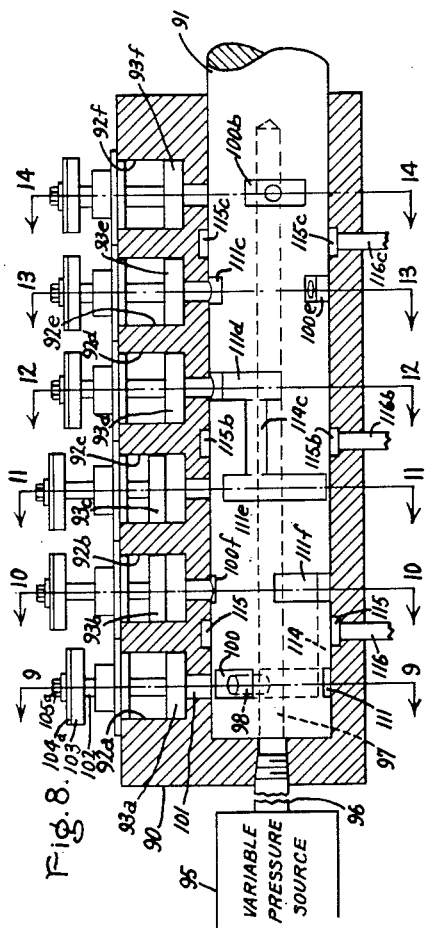
Inventor:
John A. Favre,
by Ernest C. Britton
His Attorney.

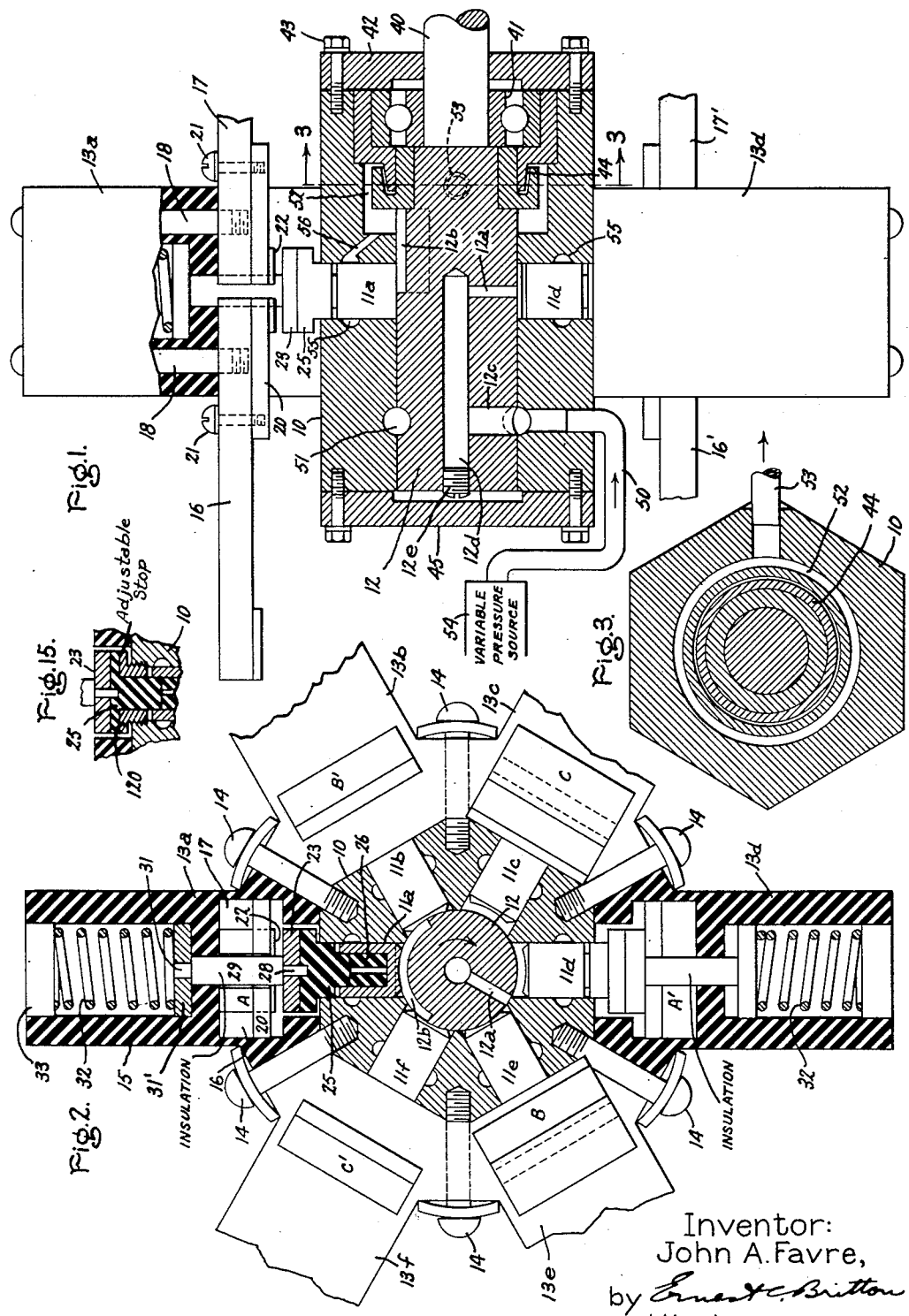

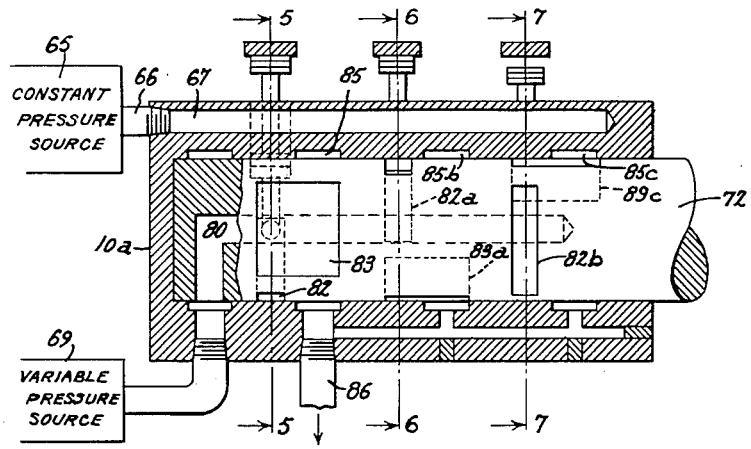
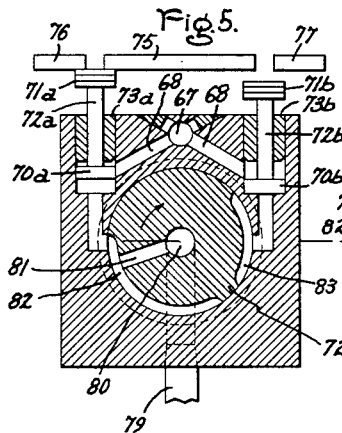

Patented Nov. 4, 1952

2,616,997

UNITED STATES PATENT OFFICE 2,616,997

CYCLIC FLUID PRESSURE OVERLAPPED MULTICONTACT SWITCHING MECHANISM FOR RECTIFIERS

John A. Favre, Drexel Hill, Pa., assignor to General Electric Company, a corporation of New York Application July 18, 1951, Serial No. 237,379

9 Claims. (Cl. 200—81.4)

1

The invention relates to cyclic overlap switching mechanism, particularly of a high speed multi-contact type adapted for synchronized operation in connection with suitable electrical circuits and apparatus for converting polyphase alternating currents of commercial frequencies to direct current or vice versa.

In commercial alternating current rectifying service, particularly in the relatively low and medium voltage ranges such as ordinarily used in electrolytic work and the like, a mechanical rectifier switch mechanism provides the highest overall operating efficiency due to the negligibly low voltage drop through the switching contacts. But to obtain this advantage it becomes essential that precisely synchronized overlapping closure and opening of a series of switching contacts controlling the rectifying circuits and apparatus be obtained in extremely rapid recurrent cycles in order properly to effect the rectifying action by sequentially transferring the current conduction from each rectifying circuit to another at the same frequency as and in proper commutating relation with the alternating current reversals.

Heretofore various forms of high speed rotating eccentric cam or wobble plate sliding push rod operated rectifier switching mechanisms have been proposed in an endeavor to meet the very exacting high speed cyclic overlap switching requirements encountered in commercial alternating current rectification service. But such mechanical sliding push rod operated rectifier switching mechanisms even though well lubricated inherently produce appreciable wear of the operating parts of the mechanism at the required frequencies of contact operation since with the usual 60 cycle alternating current over 5,000,000 closures and openings of each rectifying switch contact must be effected each day of operation. This may soon reach the usual life expectancy of most any mechanical sliding push rod operated switching device capable of rectifying currents of substantial value.

Also with such eccentric or wobble plate and sliding push rod operated rectifying switch mechanisms, it usually is a rather tedious and difficult task to accurately adjust the relative lengths of the several contact push rods so as to secure the precise overlapping closures of the contacts required for uniform contact closure or dwell as well as to readjust when it becomes necessary to compensate for any unequal wear and erosion of the contacts as well as for any uniform variation of the dwell and consequently the overlap of all the contacts when required to obtain proper

2 commutation upon a substantial variation of the load condition since only very minute lineal variations in the relative lengths of the push rods are involved per degree of rotation of the actuating eccentric or wobble plate.

One of the objects of the present invention is to provide an improved fluid pressure synchronized cyclic overlap rectifier contact operating mechanism having an improved permanently fixed and precisely angularly displaced multiport rotary valve for effecting substantially isochronous cyclic overlapping operation of all the rectifier switching contacts and thereby obtain not only accurately synchronized and uniformly overlapping dwell thereof during the rapidly repeated cycles but also provide a materially increased life of the rectifier contact synchronizing mechanism particularly when oil having good lubricating characteristics is employed as the fluid pressure synchronizing medium. A further important technical advantage is that any inherent wear and erosion of the contacts or other parts is automatically minimized by means of the improved rotary multiport valve fluid pressure synchronized contact operating mechanism without resulting in any adverse variations in the overlap or dwell of the contacts.

In carrying out the present invention in a preferred form, a separate fluid pressure responsive operator, preferably in the form of a relatively small and light weight piston, is provided for operating each of a series of rectifier contacts and the fluid pressure applied to the series of pistons is cyclically varied in overlapping synchronism thereby to overlap the closures and openings of the rectifying contacts in the series by means of a synchronously driven rotary valve having a cooperating valve body provided with permanently fixed and precisely angularly displaced pressure control ports communicating with the operating pistons to open the next preceding rectified contact in the series before closing the next succeeding rectifier contact in the series during the closure or dwell of each contact and thereby produce the required cyclic overlap operation thereof.

With each separate piston starting to move the contact operated thereby from rest, the time elapsed before the contact closes will always conform with the standard acceleration equation and the provision of a uniform mass for each piston and contact and a uniform accelerating pressure applied thereto will inherently tend to give isochronism or constant timing. Moreover, any small variations in the travel of the sequentially overlapping contacts due to any inherent wear or erosion of the parts become relatively inconsequential as the elapsed time required to travel a given distance varies directly with the velocity, which at the end of the stroke is relatively high. Thus the present invention is able to utilize a square root function instead of merely a linear one and consequently the total time becomes relatively stable and effected to only a rather negligible degree by small variations in the contact travel due to any inherent wear or erosion of the parts. This is also true of any overlapping dwell thereof during the rapidly revagrant or incidental changes in fluid pressure applied to the pistons.

Another object is to provide for uniformly varying the dwell of all the overlapping rectifier contacts by substantially varying the pressure at which the fluid synchronizing medium is applied to the contact operating pistons by means of the rotary valve. Thus, a desired change in the duration of the contact dwell can be readily accomplished by changing the fluid pressure applied to the piston to a somewhat greater degree than the incidental relatively small changes due to abnormal operating conditions such as changes of viscosity with temperature, etc. When the fluid pressure is increased in order to increase the duration of contact dwell, a higher velocity at the time of contact closure will result and hence the increased kinetic energy must be properly absorbed in order to avoid increased contact wear or erosion. But by providing a special mounting for each switch contact having suitable resilient characteristics, the force of impact of the moving contact can be suitably controlled so as to obtain reasonably long contact life. Furthermore, the variations in the contact dwell by materially increasing or decreasing the applied pressure can increase or decrease the dwell by earlier or later closure of the contacts but, if desired, may be specially arranged to lengthen the dwell at both ends. However, where a variation in the dwell at both ends becomes necessary, this may be obtained most simply by a relative angular displacement of the body with respect to the rotary valve to obtain earlier or later opening of the contacts in conjunction with an effective variation in the fluid pressure applied to the pistons to obtain the earlier or later closure of the contacts.

Further objects and advantages of the invention will appear in the description of the accompanying drawings in which Fig. 1 is a top view, partly in section, of a cyclic fluid pressure overlapped six contact rectifier switching mechanism embodying the invention; Fig. 2 is an end view partly in section showing a symmetrical radial mounting of the six operating pistons and switch units around the fluid pressure cycling rotary valve element; Fig. 3 is a cross-sectional view on the line 3—3 in Fig. 1, showing details of the fluid seal and pressure outlet construction of the rotary valve mechanism; Fig. 4 is a cross-sectional view of a modified form of cyclic fluid pressure overlapped rectifier switching mechanism having two aligned rows of three contact operating pistons with each pair mounted in opposing alignment in the cylinder block to communicate on opposite sides of the rotary fluid pressure cycling valve element having fluid pressure cycling ports angularly displaced therein; Figs. 5, 6, and 7 are cross-sectional views respectively on the section lines 5—5, 6—6, and 7—7 in Fig. 4, showing the structural details of the aligned pairs of pistons and contacts as well as the angular displacement of the pressure controlling ports in the rotary valve element; Fig. 8 is a cross-sectional view of a further modified form of the invention wherein the six rectifier contacts and the operating pistons therefor are mounted in linear alignment in a single row in the cylinder block; and Figs. 9, 10, 11, 12, 13, and 14 are respectively cross-sectional views showing the angular displacement of the pressure cycling ports provided in the elongated rotary valve element for cooperating with the respective rectifier contact operating pistons. Fig. 15 is a cross-sectional view of a modified bridging contact structure showing a separately adjustable stop to effect individual adjustment of limit of the contact opening travel.

In the radial form of rectifier six contact switching mechanism shown in Fig. 1, the combined cylinder block and valve body 10 preferably is of hexagonal cross-section as shown in Fig. 2 and provided with a radial cylinder extending to each face for mounting therein a corresponding one of the series of pistons 11a, b, c, d, e, f. With this construction the inner end of each radial cylinder communicates directly with the angularly displaced ports 12a and 12b formed in the central fluid pressure cycling rotary valve element 12. Each piston operates a corresponding one of the series of rectifier switch units 13a, b, c, d, e, f, that are removably mounted on a corresponding face of the hexagonal cylinder block 10 by suitable holding screws 14 as shown in Fig. 2.

The switch unit 13a, as shown in the cross-section, is provided with an insulating body 15 for supporting the alternating current conductor 16 and the direct current conductor 17 in spaced-apart alignment with the gap therebetween symmetrical with the axis of the corresponding cylinder. Each conductor 16 and 17 has a stationary contact 20 removably mounted thereon by means of the screw 21 and provided with a contact facing 22 formed of suitable contact material for withstanding long-continued heavy duty service. The cooperating movable bridging contact 23 is formed of similar material and is carried on an insulating mounting block 25 formed to slide in the cylinder and provided with an end extension for engaging with a resilient shock-absorbing buffer 26 carried inside the hollow piston 11a.

The movable bridging contact 23 may be removably mounted on the insulating block 25 by means of the pin 28 extending through contact 23 from the insulating push rod 29 into a suitable guide opening formed in the face of the block 25. A pin 31 aligns the other end of the push rod 29 in the guide member 31' that receives the contact opening thrust of the compression biasing spring 32. The contact opening biasing thrust can be varied by varying the position of the adjustable screw plug 33, relative to the insulating body 15. In this way the push rod 29 is maintained in axial alignment with the cylinder and piston 11a, as well as the opening biasing spring 32 so that the movable contact 23 is readily operable in self-aligning engagement with the pair of spaced-apart stationary contact faces 22 when fluid pressure is cyclically applied to the inner face of the piston 11a.

Each of the other switch units 13b, c, d, e, f is of the same construction as the switch unit 13a and for three-phase double-wave rectification, the alternating current conductors 16 of the diametrically opposite switch units 13a and 13d may be connected together to one phase, the alternating current conductors of the diametrically opposite units 13b and 13e may be connected together to another phase, and the alternating current conductors of the diametrically opposite units 13c and 13f may be connected together to the third phase. The direct current conductors of the alternate units 13a, 13c, and 13e may be connected together to one side of the direct current circuit, while the direct current conductors of the alternate units 13b, 13d, and 13f may be connected together to the other side of the direct current circuit. Any desired rectifier circuits with suitable transformer and commutating control apparatus can be used, for example, such as shown in the Koppelman Patent 2,341,326.

In order cyclically and sequentially to vary the fluid pressure applied to the pistons 11a, b, c, d, e, f, the rotary valve element 12 is rotatably mounted in the cylinder block and valve body 10 with its axis located at the point of intersection of the axes of the diametrically opposite pairs of radial cylinders formed in the block 10. The rotary valve element 12 may be provided with an operating shaft 40 that can readily be connected to be continuously driven at synchronous speed by a suitable electric motor energized from the three-phase alternating current circuit. The ball bearing 41 may be provided for rotatably supporting the shaft 40 so as to axially align the valve member 12 in the block 10 when the end plate 42 is secured in place by the bolts 43. Also suitable oil sealing labyrinth rings 44 may be provided for fluid-tight sealing of the driving end of the valve while the end plate 45 seals the other end of the valve body 10.

Preferably oil of good lubricating quality, or if desired, other suitable liquid or gas medium may be supplied to the rotary valve body 10 under pressure through the inlet conduit 50 that communicates with the inner annular conduit 51 shown as formed jointly in the rotary valve member 12 and the body 10 so as to continuously supply the fluid under pressure through the radial passage 12c to the axial passage 12d, and thence to the continuously driven rotary pressure distributing valve port 12a. The end of the axial passage 12d may be sealed by a screw plug 12e.

Upon synchronous rotation of the rotary valve element 12, the radial valve port 12a is carried into communication successively with the inner ends of the radial cylinders for the pistons 12a, b, c, d, e, f, so as to successively apply fluid pressure thereto and thereby accelerate and close the switches operated by the pistons in a predetermined overlapping sequence. The operating fluid pressure is maintained applied to each successive piston until the exhaust valve port 12b that is formed in the rotary valve member 12 in the desired predetermined angular relationship with the pressure inlet port 12a is successively brought into communication with each radial cylinder in the block 10 upon the continuous rotation of the valve member 12. Subsequently, the oil pressure in the cylinder is vented through the exhaust port 12b as indicated in Fig. 1 into an annular oil passageway 52, to which the oil outlet or return conduit 53 is connected as shown more clearly in the cross-sectional view of Fig. 3. Any oil leakage past the piston is drained into the return passageway 52 by means of an annular passageway 55 formed in each cylinder near the outer end of the piston and interconnected by a drain passage 56 with the annular oil return passage 52.

Thus upon operation in alternating current rectifier service, the valve member 12 is continuously rotated at synchronous speed to apply fluid pressure successively to the series of pistons as the oil pressure port 12a is successively brought into communication therewith at each 60° angular movement of the valve element 12. Each piston will respond to accelerate and close the corresponding switch. With the predetermined angular relationship of the inlet port 12a and the exhaust port 12b as shown, the oil pressure is maintained applied to each piston until the continued rotation of valve member 12 through approximately 150° brings the exhaust port 12b into communication therewith. Thereupon, the oil pressure will be exhausted and the biasing spring becomes effective to return the contact to the open position. The communication of each cylinder with the exhaust port 12b may continue for substantially 120° of the valve rotation.

Upon rotation of the valve element 12 from the position shown in Fig. 2 in the direction indicated by the arrow, the oil pressure will be applied to piston 11e to accelerate and close the corresponding switch, while the oil pressure is still being maintained on pistons 11c and 11d to maintain the corresponding switches closed. However, upon approximately 30° angular displacement of the valve member 12 from the position shown in Fig. 2, the exhaust port 12b will be brought into communication with the piston 11c to exhaust the pressure therefrom and effect the opening of the corresponding contacts, before the oil pressure port 12a is brought into communication with piston 11f. In this way, the predetermined angular relationship of the pressure applying port 12a and the pressure exhausting port 12b insures a predetermined overlapped closure of the next succeeding switch in the series and the opening of each preceding switch during the closure of each switch. Thus, the switch operated by piston 11e is closed before the switch operated by piston 11c is opened during the closure of the switch operated by piston 11d.

The sequential operation of the other contacts in the series will be accomplished in exactly the same manner so that the closure of each switch precisely overlaps the closure of the next preceding switch in the series as well as the next succeeding switch in the series as required to produce proper commutation of the three phase alternating current. Thus, as shown in Fig. 2, the closure of contacts 11c and 11d is overlapping, and during the next 30° of angular rotation of the valve 12, the closure of contact 11e also becomes overlapping. But after such 30° of angular rotation, contact 11c is opened, so that only contacts 11d and 11e remain overlapping until the next 30° rotation of valve 12 produces overlapping closure of contact 11f. The successive precise overlapping closure of the other contacts in the series is accomplished in exactly the same way.

Due to the fluid pressure synchronization of the overlapping operation of the switches, automatic compensation is obtained for any contact wear and erosion without resulting in any adverse variations in the overlap or dwell in the cyclic closures of the contacts, thus enabling accurately synchronized commutation of the rectified current to be obtained throughout a relatively long period of rectifying switching service, particularly when oil is used as the fluid pressure synchronizing medium.

The oil under pressure may be supplied to the rotary valve 12 through conduit 50 from any suitable variable pressure source 54, such for example as a continuously driven gear pump drawing oil from the drain return sump and provided with an adjustable pressure responsive by-pass valve for varying the oil pressure supplied to conduit 59. Thus, when it is desired to vary the closure or dwell of the movable contacts of the rectifier switches, all that is necessary is to vary the pressure at which the oil is supplied to the rotary valve 12. When the oil pressure is decreased, the contact acceleration will be decreased and hence the initial closure of each contact will be correspondingly delayed, and when the oil pressure is increased, the contact acceleration will be increased and hence the initial closure of each contact will be advanced. In case it should be desired to change the termination of the contact closure relative to phase, then the valve body 10 may be rotated relative to the valve member 12 (or the motor may have a stator shifter) so as to correspondingly retard or advance the communication of the exhaust port 12b with each of the successive cylinders. Consequently, by both varying the oil pressure to retard or advance the initial closure and rotating the valve body 10 to advance or retard the termination of the closure, variations at both ends of the dwell of the contacts can be readily obtained as required to obtain proper commutation under varying load conditions, or to control the voltage of the rectified direct current.

As indicated in Fig. 15, if desired, each of the movable bridging contacts 23 that are biased to the open position in Fig. 1 as well as the movable bridging contacts in each of the modifications may be provided with a suitable separately adjustable stop 120 that may be screw threaded in the body 10 as shown to effect individual adjustment of the limit of contact opening travel and thereby individually control the contact timing to obtain uniform dwell in case of any manufacturing or other variations in the parts.

In the modification shown in Fig. 4, three cooperating pairs of pistons and contacts are mounted in double row alignment in an elongated cylinder block and valve body 10a. In this modification, the contact biasing springs are eliminated and the biasing of the pistons to open the contacts is accomplished by a fluid pressure admitted from source 65 through the conduit 66 to the passageway 67 that communicates through suitable cross-passages 68 as shown in Figs. 5, 6, and 7 with the space in the cylinder above each of the pistons 70a, b, c, d, e, f that operate the corresponding movable contacts 71a, b, c, d, e, f of the rectifier switching mechanism, so as normally to bias each of these pistons and contacts to the circuit-opening position. The operating fluid pressure on the opposite or lower side of each of the pistons is supplied from the variable pressure source 69 and cyclically varied by means of the elongated rotary valve member 72 that is synchronously driven and may be provided with a suitable seal such as shown in Fig. 1.

The piston 70a is operatively connected to the rectifier contact 71a by means of the insulating push rod 72a that is slidably mounted in the guide plug 73a that is suitably secured in the upper end of the cylinder in which the piston 70a operates. The other pistons and contacts are operatively connected in a similar manner. The pair of rectifier contacts 71a and 71b serve to interconnect the alternating current phase conductor 75 to either of the direct current conductors 76 or 77. In a similar way, the pairs of contacts 71c and 71d and 71e and 71f serve to connect the other alternating current phase conductors 78 and 79 respectively to either one of the direct current conductors 76 and 77.

In operation, when fluid pressure is supplied from the variable pressure source 69, through conduit 79 to the axial passageway 80 in the rotary valve element 72, this pressure will be communicated through the radial passageway 81 to the port 82 and thence to the underside of the piston 70a as shown in Fig. 5. As a result, the pressure differential on piston 70a becomes effective to accelerate and operate the bridging contact 71a into circuit closing engagement with the conductors 75 and 76. Upon continued rotation of the valve element 72 through approximately 150 degrees, the exhaust port 83 will communicate with the underside of piston 70a to exhaust the fluid pressure therefrom through the annular passageway 85 formed in the valve body 10a so as to exhaust the fluid pressure through the outlet conduit 86 and thereby permit the biasing fluid pressure on the upper side of piston 70a to return the contact 71a to the circuit opening position.

Both contacts 71a and 71b will remain in the circuit opening position until a further rotation of valve element 72 through approximately 30 degrees, thereupon the pressure inlet port 82 will communicate with the underside of piston 70b to effect acceleration and operation of the contact 71b to interconnect the alternating current conductor 75 with the direct current conductor 77. Contact 71b will be maintained closed through substantially 150 degrees angular rotation of the valve element 72, until the exhaust port 83 is brought into communication with the underside of the piston 70b to exhaust the pressure therefrom and return contact 71b to the open position. Both contacts 71a and 71b again will remain open until the succeeding angular rotation of valve element 72 again brings the pressure inlet port 82 into communication with the underside of piston 70a to close contact 71a.

As shown in Fig. 6, the rotary valve element 72 is provided with the axially aligned inlet pressure port 82a and exhaust port 83a for cyclically varying the pressure on the underside of the pistons 70c and 70d in exactly the same way as just described, except that these ports are angularly displaced 120 degrees from the ports 82 and 83, in order to produce the precise overlapping operation of the rectifier contacts as required to produce the proper commutation of the alternating current. Similarly, the corresponding pressure controlling ports 82b and 83b are angularly displaced another 120 degrees and axially aligned for effecting similar sequential operation of the rectifier contacts 71e and 71f to produce the required precise overlapping closures thereof in synchronism with the reversal of the alternating current in order to produce the desired rectifying action.

Upon substantial variation of the pressures applied to the inlet conduit 79, the contact acceleration can be either increased or decreased, and hence the closure of each contact will be correspondingly advanced or delayed, in order to uniformly vary the dwell of each of the rectifier contacts. By effecting an angular displacement of the rotary valve member 72 with respect to the synchronism of the alternating current, and also varying the oil pressure, variations at both ends of the dwell of the contacts can be readily obtained as required to obtain proper communication under varying load conditions or to control the voltage of the rectifier direct current.

In the further modification shown in Fig. 8, all six of the pistons 93a—b—c—d—e—f and rectifier switching contacts 104a—b—c—d—e—f operated thereby are mounted in alignment in a single row in a further elongated cylinder block and valve body 90, having the correspondingly elongated rotary valve element 91 that may be operated synchronously therein in the same manner as previously described. Fluid pressure is supplied from a suitable variable pressure source 95 through the conduit 96 to the axial passage 97 formed in the rotary valve element 91. To actuate the piston 93a, the fluid pressure is communicated from the axial passage 97 through the radial passage 98a to the port 100 that will upon rotation of valve 91 in the direction indicated by the arrow in Fig. 9 register with the port 101 formed in the valve body 90 so as to communicate the pressure to the underside of the piston 93a. The resulting thrust of piston 93a moves the piston rod 102 to operate the rectifier movable contact member 104a, that may be removably mounted on the insulating block 103 by means of the insulated mounting bolt 105. In this way the contact member 104 is accelerated and carried from the open position to which it previously has been operated by fluid pressure into circuit-closing engagement with the stationary switch contact 106a and 109a.

As indicated in Fig. 9, when the angular rotation of the valve element 91 brings the port 100 into register with the port 101 so as to communicate the contact closing pressure to the underside of the piston 93a, fluid pressure can be exhausted from the upper side of the piston 93a by the registering of the exhaust port 111 with the port 112 formed in the body 90 and communicating through the passage 113 with the cylinder above the piston 93a. This exhaust port 111 communicates through the lateral passage 114 formed in the periphery of the rotary valve element 91 with the annual groove 115 formed in the body 90 and thence is discharged through the conduit 116 to a suitable sump from which the fluid may be returned to the variable pressure source 95 in a suitable manner as previously described.

Each of the successive pistons 93b—c—d—e—f in the series is operated in the same way as the piston 93a, except that the inlet ports 100b—c—d—e—f and the exhuast ports 111b—c—e—f are successively angularly displaced from each other by 60 degrees as indicated in the cross-sectional views of Figs. 10, 11, 12, 13 and 14. Consequently, the series of pistons 93a—b—c—d—e—f are operated in the predetermined sequence required to effect the cyclic overlapping closure and opening of the series of contacts 104a—b—c—d—e—f in sequence so as to effect proper commutation and rectification of 3-phase alternating currents. To this end, the switch contacts 106a and 106b may be connected to one phase conductor, the contacts 107a and 107b to the second phase conductor, and contacts 108a and 108b to the third phase conductor of the alternating current circuit which may be supplied from any suitable source such as the secondary of a Y-connected transformer. Likewise, the switch contacts 109a—b—c may be connected to one side of the direct current circuit and the switch contacts 110a—b—c connected to the other side of the direct current circuit.

As indicated in Fig. 8, the annular grooves 115a—b—c and separate drains 116a—b—c may be located between each adjacent pair of the cylinders 93a—b—c—e—f so as to communicate with the lateral passages 114a—b—c that interconnect the adjacent pairs of exhaust ports 111a—b—c—e—f or if desired, all of the passages 114a—b—c may be interconnected together to drain into one common drain conduit 116.

While I have shown and described certain particular embodiments of my invention, I do not desire my invention to be limited to the constructions shown and described for it will, of course, be obvious that changes may be made without departing from my invention. I therefore aim in the appended claims to cover all such changes and modifications as fall within the true spirit and scope of my invention.

What I claim as new and desire to obtain by Letters Patent of the United States is:

1. A cyclic overlap alternating current rectifier switching mechanism having in combination a series of switches, each having a separate fluid pressure responsive operator, and means for cyclically varying the fluid pressure applied to the operators to sequentially close and open the series of switches in recurrent cycles including a synchronously driven multi-port rotary valve mechanism provided with fluid pressure control passages communicating with the operators to close the next succeeding switch in the series before opening each switch.

2. A cyclic overlap alternating current rectifier switching mechanism having in combination a series of switches, each having a separate fluid pressure responsive operator, and means for cyclically varying the fluid pressure applied to the operators to sequentially close and open the series of switches in recurrent cycles including a synchronously driven multi-port rotary valve mechanism provided with fluid pressure control passages communicating with the operators to close the next succeeding switch in the series before opening each switch, and means for controlling the fluid pressure supplied to the valve mechanism to vary the duration of closure of the switches.

3. A cyclic overlap polyphase alternating current rectifier switching mechanism having in combination a series of switches, each having a movable bridging contact, a separate fluid pressure responsive operator for each bridging contact, and means for cyclically varying the fluid pressure applied to the operators to sequentially close and open the bridging contacts of the series of switches in recurrent cycles including a continuously driven rotary multi-port fluid pressure inlet and exhaust valve element having a cooperating valve body provided with a series of angularly displaced registering fluid pressure control passages communicating with the operators to close the next succeeding bridging contact in the cycle before opening the next preceding bridging contact in the cycle during the closure of each contact.

4. A cyclic overlap polyphase alternating current rectifier switching mechanism having in combination a series of switches, each having a movable bridging contact, a separate fluid pressure responsive operator for each bridging contact, and means for cyclically varying the fluid pressure applied to the operators to sequentially close and open the bridging contacts of the series of switches in recurrent cycles including a continuously driven rotary multi-port fluid pressure inlet and exhaust valve element having a cooperating valve body provided with a series of angularly displaced registering fluid pressure control passages communicating with the operators to close the next succeeding bridging contact in the cycle before opening the next preceding bridging contact in the cycle during the closure of each contact, and means for varying the pressure of the fluid supplied to the valve element to vary the duration of closure of the switches.

5. A cyclic overlap polyphase alternating current rectifier switching mechanism having in combination a series of separately operable switches, each having a fluid pressure operating piston, a cylinder block for the pistons provided with ports in the block communicating with the pistons, and means including a synchronously driven rotary fluid pressure valve element mounted in the block and provided with ports for registering with the ports in the block to effect the closure of the next succeeding switch in the cycle before opening each preceding switch during the closure of each switch.

6. A cyclic overlap polyphase alternating current rectifier switching mechanism having in combination a series of separately operable switches, each having a fluid pressure operating piston, a cylinder block for the pistons provided with ports in the block communicating with the pistons and having separately adjustable means for varying one limit of travel of each piston, and means including a synchronously driven rotary fluid pressure valve element mounted in the block and provided with ports for registering with the ports in the block to effect the closure of the next succeeding switch in the cycle before opening each preceding switch during the closure of each switch, and means for controlling the fluid pressure supplied to the rotary fluid pressure valve element to uniformly vary the duration of closure of the switches.

7. A cyclic overlap polyphase alternating current rectifier switching mechanism having in combination a plural cylinder block provided with a piston in each cylinder and ports communicating with the cylinders, a plurality of switches, each having a movable contact operated by a corresponding piston and means for cyclically varying the fluid pressure applied to the pistons to sequentially close and open the switches in recurrent cycles including a synchronously driven rotary multi-port valve element mounted in the cylinder block to register with the ports in the block communicating with the cylinders to close the next succeeding switch in the cycle before opening each switch.

8. A cyclic overlap polyphase alternating current rectifier switching mechanism having in combination a plural cylinder block provided with ports communicating with the cylinders and having a piston in each cylinder provided with means for biasing the piston to one position, a plurality of switches, each having a bridging contact carried by a corresponding piston and means for cyclically varying the fluid pressure applied to the pistons to sequentially close and open the switches in a cycle including a synchronously driven rotary multi-port fluid pressure inlet and exhaust valve element mounted in the cylinder block to register with the ports in the block communicating with the pistons to close the next succeeding switch in the cycle before opening the preceding switch during the closure of each switch.

9. A cyclic overlap polyphase alternating current rectifier switching mechanism having in combination a cylinder block having a series of cylinders formed therein and each provided with a piston and a control port communicating with one side of the piston, means including passages in the block for supplying fluid pressure to the other side of each piston for biasing the piston to a predetermined position in the cylinder, a multi-port fluid pressure supply and exhaust valve rotor mounted in the cylinder block for registering with the control ports in the cylinder block for varying the fluid pressure differential to operate the piston each way in the cylinder at predetermined time intervals upon constant speed rotation of the valve rotor, and a corresponding series of separately operable switches, each having a movable contact connected to be operated by a corresponding piston.

JOHN A. FAVRE.

No references cited.